(12) United States Patent
Hermey et al.

(10) Patent No.: US 11,227,707 B2
(45) Date of Patent: Jan. 18, 2022

(54) STRAIN RELIEF, END FASTENING PART HAVING STRAIN RELIEF, AND CLAMPING PART THEREFOR

(71) Applicant: igus GmbH, Cologne (DE)

(72) Inventors: Andreas Hermey, Hennef (DE); Ralf Steeger, Lohmar (DE); Thilo-Alexander Jaeker, Sankt Augustin (DE); Bilal Yilmaz, Cologne (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 16/494,089

(22) PCT Filed: Mar. 14, 2018

(86) PCT No.: PCT/EP2018/056464
§ 371 (c)(1),
(2) Date: Sep. 13, 2019

(87) PCT Pub. No.: WO2018/167184
PCT Pub. Date: Sep. 20, 2018

(65) Prior Publication Data
US 2020/0135366 A1 Apr. 30, 2020

(30) Foreign Application Priority Data

Mar. 14, 2017 (DE) ...................... 20 2017 101 483.5

(51) Int. Cl.
*H01R 13/58* (2006.01)
*H01B 17/12* (2006.01)
(Continued)

(52) U.S. Cl.
CPC .............. *H01B 17/12* (2013.01); *F16G 13/16* (2013.01); *H01R 13/5825* (2013.01);
(Continued)

(58) Field of Classification Search
CPC .... H01B 17/12; H02G 11/006; H02G 15/007; H01R 13/5825; H01R 13/5837; F16G 13/16
(Continued)

(56) References Cited

U.S. PATENT DOCUMENTS

| 2,348,096 A | 5/1944 | Schack |
| 4,108,527 A | 8/1978 | Douty et al. |

(Continued)

FOREIGN PATENT DOCUMENTS

| CN | 101552399 | 10/2009 |
| CN | 202972194 | 6/2013 |

(Continued)

OTHER PUBLICATIONS

Search report from corresponding German Appln. No. 20 2017 101 483.5, dated Nov. 14, 2017.
(Continued)

*Primary Examiner* — Phuong K Dinh
(74) *Attorney, Agent, or Firm* — Grossman, Tucker, Perreault & Pfleger, PLLC

(57) ABSTRACT

A tension relief for supply lines and a block-like clamping part therefor, which has a lateral surface designed as a clamping surface. The clamping surface of the clamping part is formed at least in one clamping portion by an elastic wall, which is delimited on the side facing away from the clamping surface by a cavity structure, which is formed by additional walls. The clamping part can be variedly used without modification on certain line diameters, in particular in a tension relief of a cable carrier or also in a connector housing.

28 Claims, 9 Drawing Sheets

(51) Int. Cl.
*F16G 13/16* (2006.01)
*H02G 11/00* (2006.01)
*H02G 15/007* (2006.01)

(52) U.S. Cl.
CPC ....... *H01R 13/5837* (2013.01); *H02G 11/006* (2013.01); *H02G 15/007* (2013.01)

(58) Field of Classification Search
USPC ......................................................... 439/449
See application file for complete search history.

(56) References Cited

U.S. PATENT DOCUMENTS

| | | | |
|---|---|---|---|
| 5,627,342 A | 5/1997 | Kramer | |
| 5,713,912 A | 2/1998 | Porter | |
| 6,367,238 B1* | 4/2002 | Fischer | F16G 13/16 59/78.1 |
| 7,082,852 B2 | 8/2006 | Ikeda et al. | |
| 7,785,160 B2 | 8/2010 | Shimizu | |
| 8,783,629 B2* | 7/2014 | Even | F03D 80/85 248/68.1 |
| 8,997,448 B2* | 4/2015 | Casadei | E02D 17/13 59/78.1 |
| 9,751,219 B2* | 9/2017 | Kono | F16L 3/23 |
| 2012/0281958 A1 | 11/2012 | Petersen et al. | |
| 2013/0255424 A1* | 10/2013 | Kume | B25J 19/00 74/490.01 |

FOREIGN PATENT DOCUMENTS

| | | |
|---|---|---|
| CN | 103671544 | 3/2014 |
| DE | 2417353 | 10/1975 |
| DE | 3016628 | 11/1981 |
| DE | 7818648.8 | 12/1989 |
| DE | 4323370 | 1/1995 |
| DE | 20305479 | 6/2003 |
| DE | 10348815 | 5/2004 |
| DE | 202006007155 | 7/2006 |
| DE | 202009005647 | 6/2009 |
| DE | 202014008413 | 10/2014 |
| DE | 102015114300 | 3/2016 |
| DE | 102014017969 | 6/2016 |
| DE | 202017102147 | 5/2017 |
| EP | 0517465 | 12/1992 |
| JP | 05321966 | 12/1993 |
| JP | 05340438 | 12/1993 |
| JP | 11205965 | 7/1999 |
| JP | 2002504655 | 2/2002 |
| JP | 2012100460 | 5/2012 |
| KR | 10-2012-0098315 | 9/2012 |
| WO | 2010/117558 | 10/2010 |

OTHER PUBLICATIONS

English translation of International Search Report from corresponding PCT Appln No. PCT/EP2018/056464, dated Jun. 4, 2018.
English translation of International Preliminary Report on Patentability from corresponding PCT Appln No. PCT/EP2018/056464, dated Sep. 17, 2019.
English translation of search report from related Chinese Appln. No. 201880028411.8, dated Dec. 2, 2020.
Japanese Office Action from related Japanese Appln. No. 2019-549545, dated Sep. 7, 2021 English translation attached.

* cited by examiner

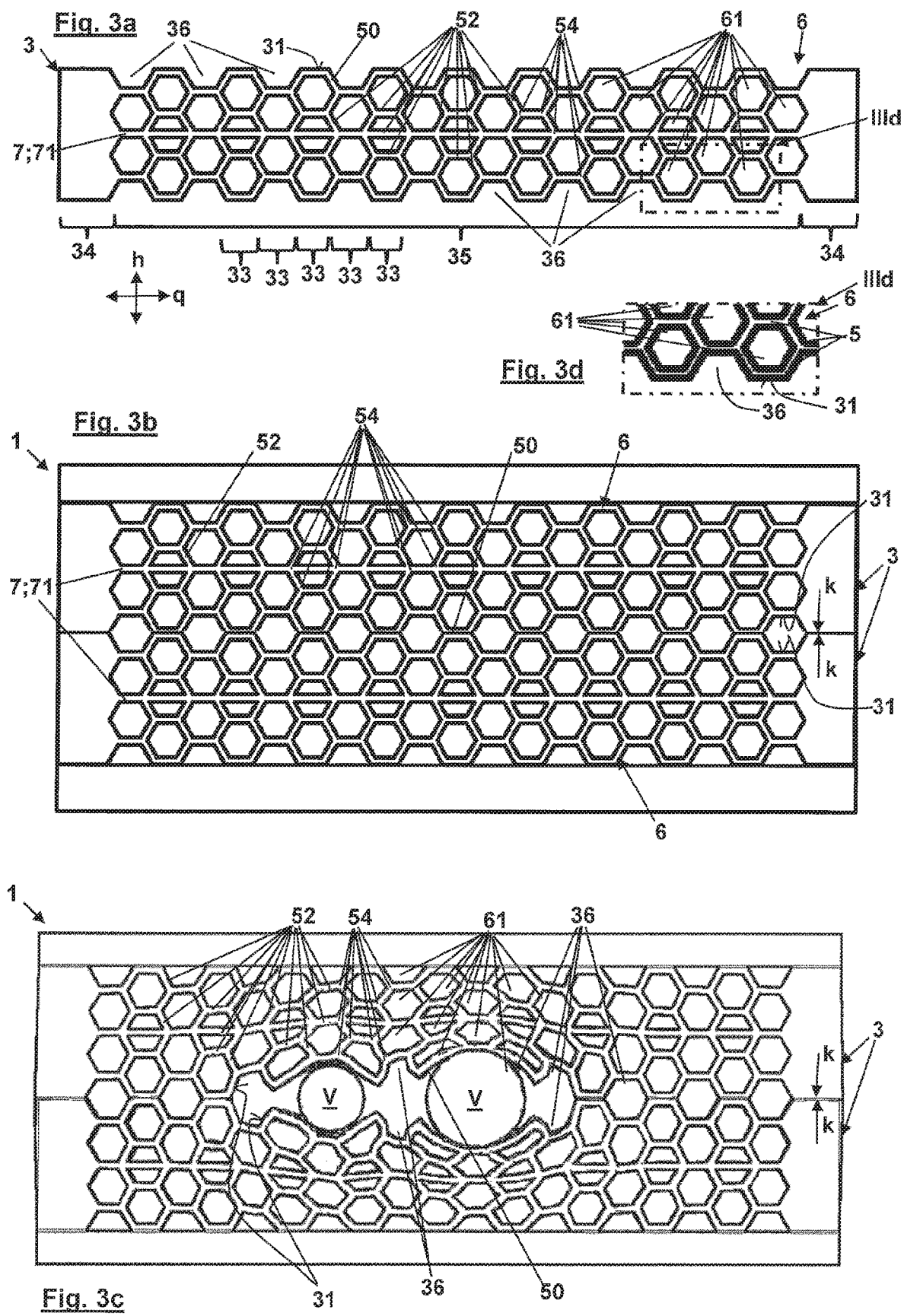

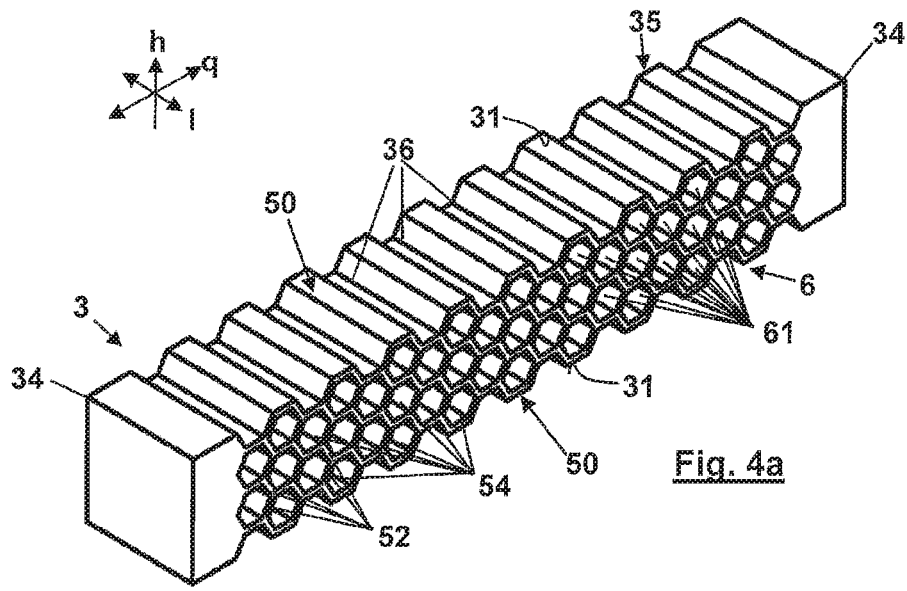
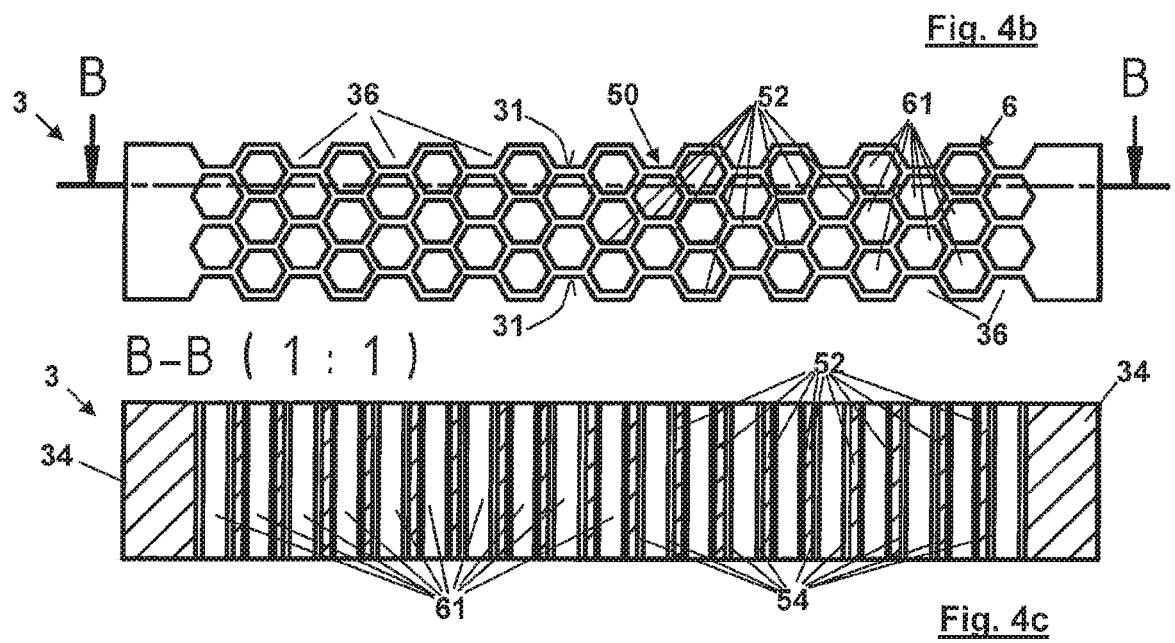
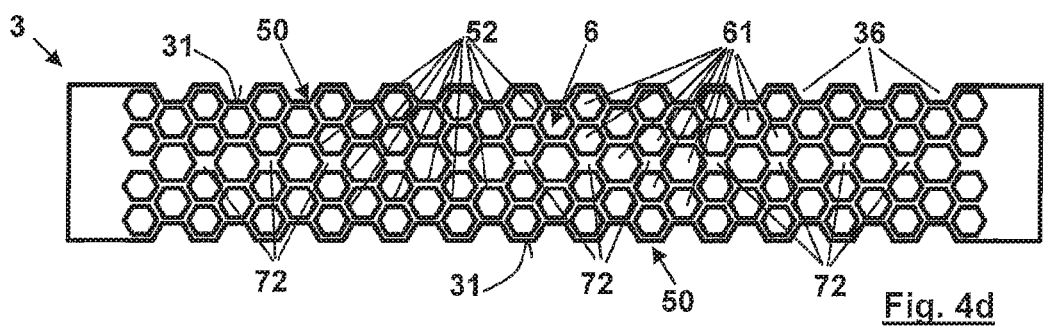

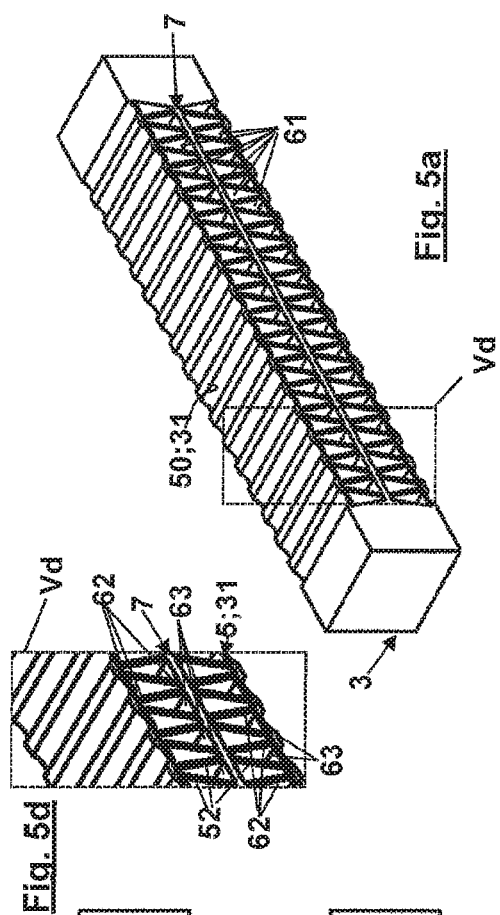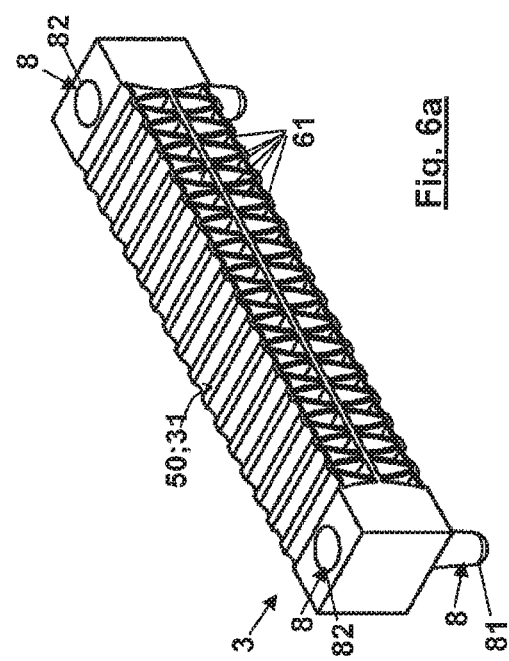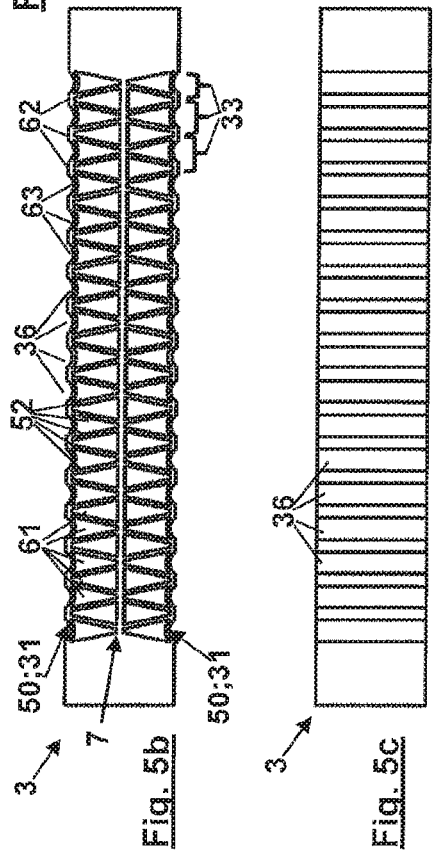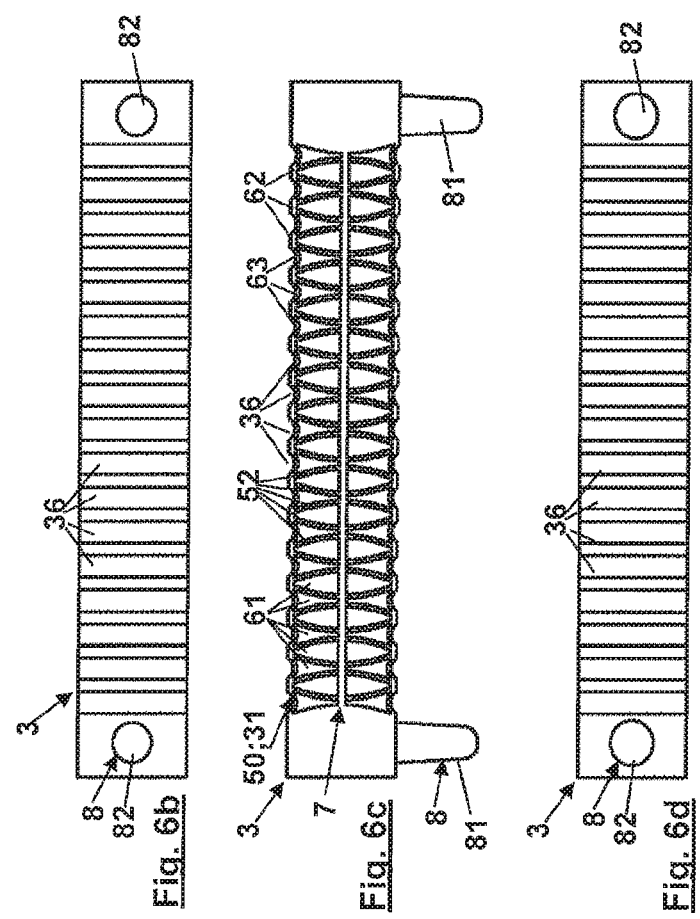

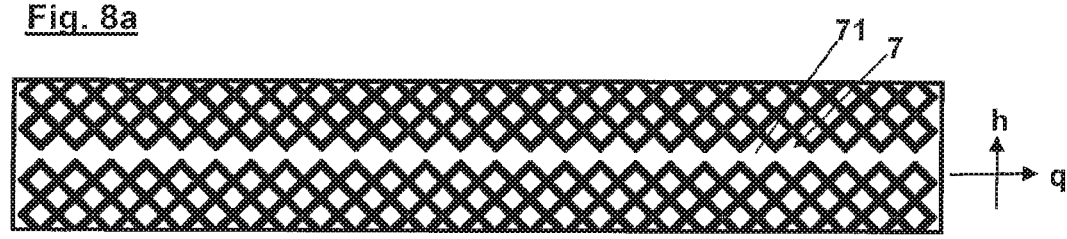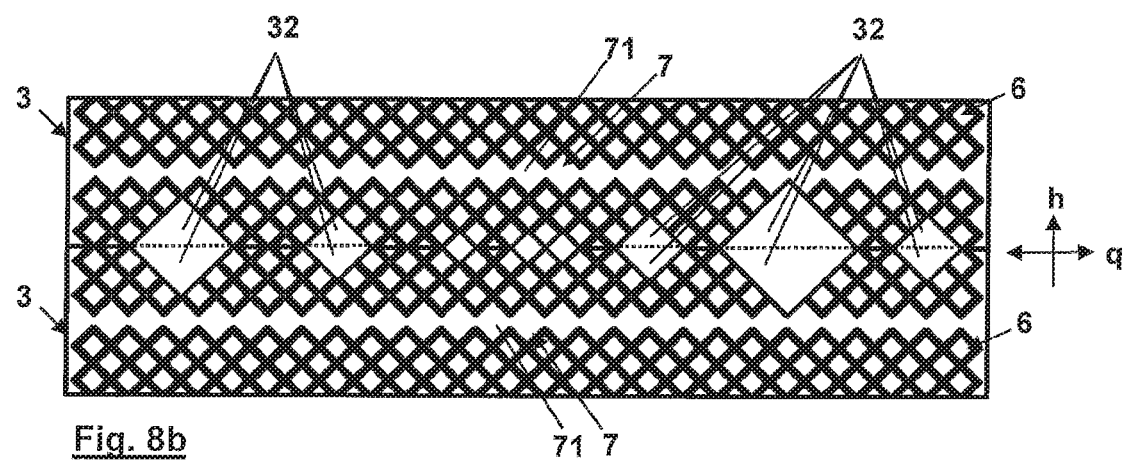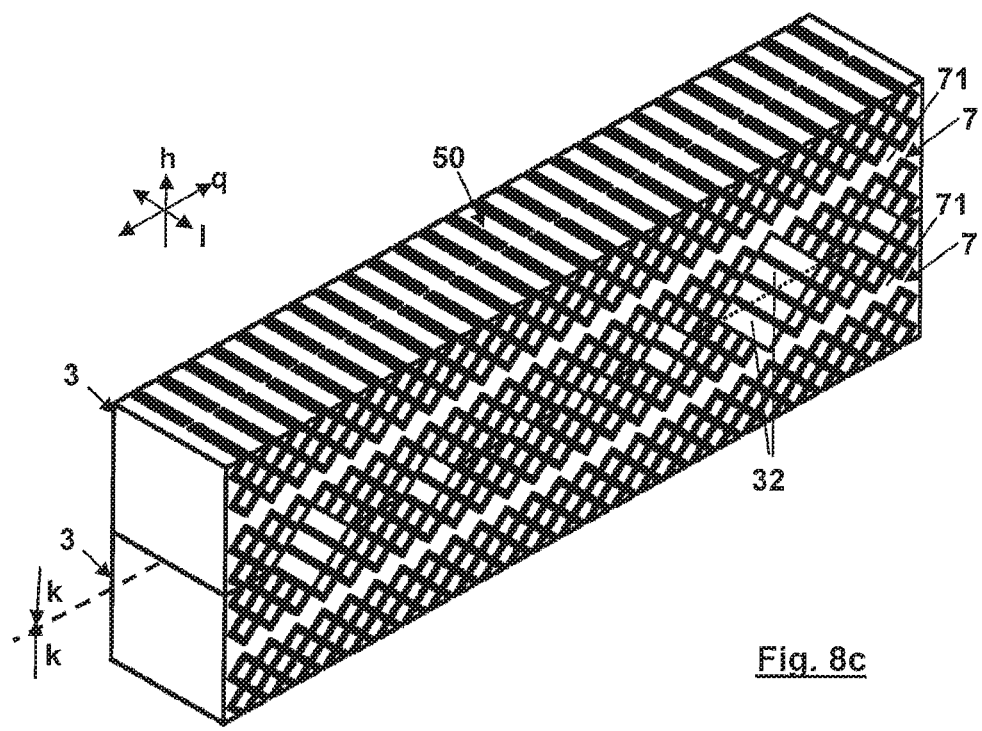

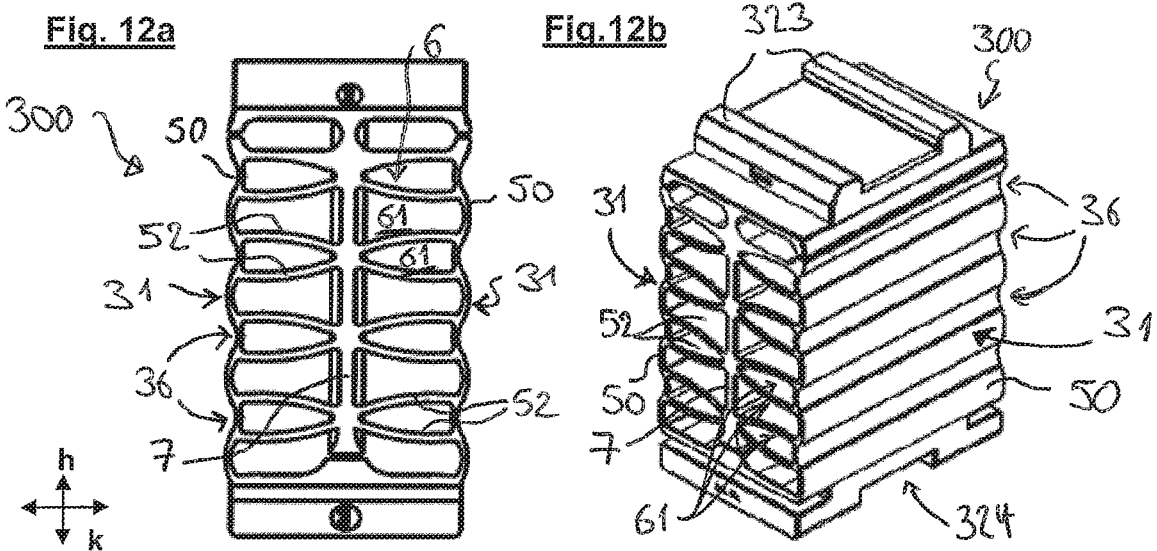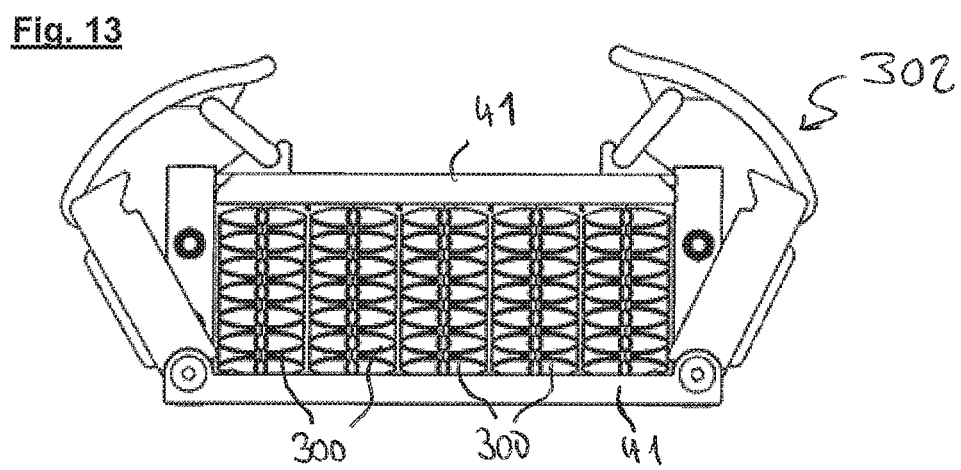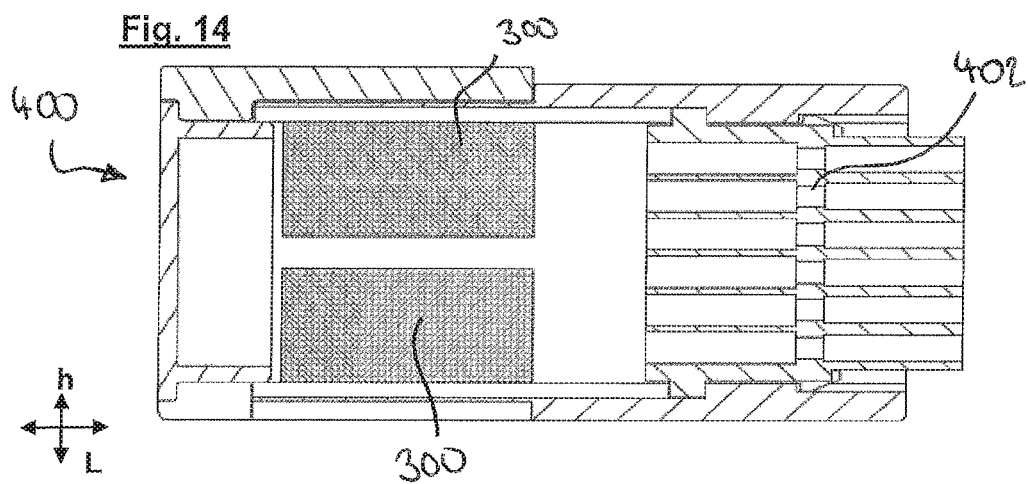

STRAIN RELIEF, END FASTENING PART HAVING STRAIN RELIEF, AND CLAMPING PART THEREFOR

FIELD

The invention relates to a strain reliever for supply lines of a supply line device, in particular of an energy chain, comprising a clamping apparatus having at least one block-like clamping part which has a side surface configured as a clamping surface for clamping the supply lines in place against a further clamping surface of the clamping apparatus, the strain reliever being designed for passage of the supply lines in a longitudinal direction perpendicular or approximately perpendicular to the clamping direction. The invention further relates to an end-fastening part having a strain reliever.

BACKGROUND

Generic strain relievers generally serve to fix mobile lines, for example lines guided in an energy chain, to end points in order to relieve the tensile forces on a region located therebetween.

A generic strain reliever is disclosed in the applicant's catalog, "igus Katalog e-ketten und-systeme 2015", page 1175, wherein the strain reliever is reproduced diagrammatically in FIG. 1 of the present application. The strain reliever here has a plurality of clamping parts, between which the supply lines are clamped in place. Receptacles in the form of receiving channels are incorporated into the clamping surfaces of the clamping parts, each of which channels is laboriously adapted to one very specific supply line. Each of the supply lines has to be placed individually and in succession into the receiving channel provided for it. The laborious special fabrication entailed by the necessary adaptation of the strain reliever to the supply lines desired by the customer and furthermore the matching fitting of the supply lines in the strain reliever are disadvantageous.

DE 203 05 479 U1 furthermore discloses a strain reliever with a strain-relief element to which the supply lines are fixed, for example by means of cable ties.

DE 20 2009 005 647 U1 discloses a strain reliever for a plurality of supply lines, wherein said lines are in each case individually fixed in place in the strain reliever by means of cable clamps and pressing jaws.

Further strain relievers specifically for energy chains are known from DE 2006 007 155 U1 and DE 2014 008 413 U1, which both propose elements or supports which consist of a flexible material, for example Vulkollan, foam or foam rubber as clamping parts. These clamping parts are of a monolithic plate-like construction, similar to that in the above-stated catalog, and may optionally also have semicylindrical recesses on one clamping surface for the lines to be received, each of which recesses is fabricated to the correct size for the cross-section of the line (cf. FIG. 1). These solutions are only suitable to a limited extent or involving particular effort for supply lines which vary in diameter and/or number.

In order to improve adaptation to the number and differing diameters of the lines, DE 24 17 353 proposed using an elastically deformable clamping lip of foam which has a specific cross-sectional profile, for example an Ω profile, perpendicular to the strain relief direction.

One problem addressed by the invention is that of providing a generic strain reliever or an end-fastening part with the generic strain reliever which can be produced with less effort and is universally applicable with regard to the supply lines to be fixed.

SUMMARY

According to the invention, the problem of interest is solved simply by the clamping surface being formed, at least in a clamping portion intended for clamping the supply lines in place, by an elastic wall, wherein, on the side remote from the clamping surface, the elastic wall bounds a cavity structure which extends through the clamping part in particular in or approximately in the longitudinal direction.

Since the elastic wall having the clamping surface bounds the cavity structure extending through the clamping part, the elastic wall can be pressed into a cavity when the supply line or supply lines are clamped in place. In conjunction with the cavity structure, the elastic wall generates a sufficient clamping action.

The elastic wall having the clamping surface forms an outer wall of the clamping part. The cavity structure may in particular be formed by a number of inner walls. The cavity structure may for example comprise continuous, duct-like openings and/or be formed similarly to a honeycomb structure.

In order to clamp the supply lines in place, the elastic outer wall may be configured to be elastically extendible into the cavity structure contrary to the clamping direction. When the supply lines are clamped in place, they press the elastically extendible outer wall into the for example duct-like open spaces of the cavity structure. In this way, a defined restoring force acting on the supply lines can be generated which is designed to hold the supply lines stationarily in the strain reliever. The wall thicknesses of the outer wall and/or inner walls of the cavity structure are preferably dimensioned such that the restoring force generates a contact pressure on the supply lines which is sufficiently large to hold the supply lines stationarily in the strain reliever without impairing the supply lines in particular with regard to the functionality thereof.

On clamping in place, a supply line receiving space, which conforms or adapts to the supply line, may in each case be formed due to the deformation of the elastic wall having the clamping surface. This receiving space is bounded contrary to the clamping direction by the elastic outer wall pressed into the cavity. In particular, due to the elastic deformation, the elastic wall having the clamping surface fits itself to the supply line or supply lines during fixing thereof. In this way, supply lines of differing diameters can be clamped in place without entailing subsequent machining of the clamping part. With regard to line diameter, the strain reliever is thus universally applicable over a broad range of diameters. The supply line or supply lines need not, as in the closest prior art (FIG. 1), necessarily be inserted at a specific point of the clamping surface which has been individually adapted to the respective supply line, so simplifying fitting. The clamping part thus need not be adapted or produced in line with an fitting plan.

The mechanical properties of the clamping part, such as the resilience of the clamping surface and of the clamping part, and support of the clamping surface can be purposefully set by the design or geometric form of the cavity structure. The strain reliever can thus also purposefully be put to versatile use with regard to the supply lines to be fixed in the light of an application-dependent grouping of supply lines to be fixed.

Elastic deformation preferably takes the form of an extension and/or compression of the flexible wall in such a way that the wall at least in part rests flat against the outer contour of the supply lines. In this way, the static friction between the supply line(s) and wall can be raised and transfer of the elastic restoring force into the supply line improved. The elastic wall may in this respect be described as a flexible wall, in particular also as a flexibly extendible and/or flexibly compressible wall.

In a clamping position, the supply line(s) is/are arranged clamped in place under pressure over a longitudinal portion against a further clamping surface of the clamping apparatus. The further clamping surface may form a mating clamping surface or, in general, an abutment to the wall or side surface of the block-like clamping part configured as a clamping surface.

The further clamping surface may, however, in particular be an elastic wall on the outside of a further clamping part of identical construction with the cavity structure according to the invention.

In particular, the elastic restoring force and thus the clamping force are purposefully settable in the course of production. This may be achieved for example via the configuration of the cavity structure and/or via the configuration of the elastic wall, in particular via the wall thickness and/or flexibility thereof. In this way, the strain reliever can be straightforwardly custom designed, for example for specific types and sizes of supply line. On the other hand, the strain reliever may be configured in particular via the design of the cavity structure such that it is universally usable for a plurality of different diameters of supply lines. The desired flexibility, in particular elasticity, in conjunction with suitable static friction may also be achieved inter alia by suitable material selection. Thermoplastic elastomers are particularly preferred.

In particular, the cavity structure extends in duct-like manner through the entire clamping part. Duct-like here means that the cavity structures have at least one duct, but preferably a plurality of to numerous ducts, which, in the longitudinal direction, are in each case open to the outside at both ends, but laterally, i.e. transversely of the longitudinal direction, are completely closed to the outside. In particular, the ducts may be arranged parallel to one another and extending in the longitudinal direction. The longitudinal direction here relates to the longitudinal direction of the lines to be clamped.

In a preferred embodiment of the strain reliever, the cavity structure may be bounded by one or more passage openings extending in the longitudinal direction which, or at least some of which, is/are bounded by the elastic wall having the clamping surface. This wall may here be supported or purposefully stiffened contrary to the clamping direction by further inner walls which form the passage openings.

When the supply lines are clamped between the clamping surfaces in the clamping direction, the elastic wall is pressed contrary to the clamping direction into the cavity structure, whereby inter alia they themselves and also the cavity structure undergo elastic deformation. In this way, it is for example possible to provide a kind of spring system with the outer wall, similar to a leaf spring fixed at both ends, which, in the inserted position, exerts an elastic restoring force on the supply line or supply lines, the clamping in place of which has extended the wall. On this basis and as shown below in greater detail, specific restoring forces can be preset by means of design measures, such as the number, arrangement and configuration of the passage openings or inner walls or wall thickness of the wall(s), and/or material-specific measures, such as the elasticity of the wall, so making the strain reliever suitable for example for different diameters of supply lines, different kinds of supply lines and/or for supply lines with different cross-sections.

The passage openings are preferably of a constant cross-section over their entire length. In particular, the clamping surface may be formed by the wall of mutually adjoining passage openings or with interposed inner walls. Furthermore, in the unloaded state, the clamping surface may be of at least substantially uncurved configuration.

In a further development of the strain reliever, the passage openings may preferably be arranged directly mutually adjoining one another via elastic walls, i.e. the passage openings are bounded by further inner walls. In this way, the elastic deformation of a passage opening may in part be transferred onto adjacent passage openings by the inner elastic walls, via which adjacent passage openings adjoin one another, likewise being elastically deformed.

Advantageously, at least the predominant proportion of the clamping surface or the entire clamping surface may be formed by the wall of mutually adjoining passage openings, i.e. a continuous outer wall bounds a number of passage openings outwardly on the line side. In this way, the entire clamping surface may be specifically preset, in particular with regard to its elastic extension, across its lateral extent.

It is straightforward in manufacturing terms for the wall thickness of at least the wall forming the clamping portion of the clamping surface and the wall thickness of the walls via which the passage openings adjoin one another, i.e. the inner walls, to be at least approximately or precisely the same size.

In particular, the wall thickness of the elastic wall may preferably be designed smaller, in particular smaller by a multiple than an average diameter of the passage openings.

In a further development of the strain reliever, the wall thickness of the elastic wall or of the elastic walls may be less than or equal to one third of the average diameter, less than or equal to one eighth of the average diameter or less than or equal to one tenth in each case of the average diameter of the mutually adjoining passage openings.

The average diameter relates to the cross-section of one specific passage opening. An average diameter may be determined from the mean of a plurality of diameters of differing orientation perpendicular to the longitudinal direction, wherein the diameters in each case for example pass through a centroid of the cross-section. The smaller is the ratio of wall thickness to average diameter of the passage openings, the greater is the resilience of the spring system and clamping block.

The passage openings associated with the clamping surface may be of congruent or at least similar configuration. In particular, the passage openings may have an identical size, an identical cross-section and/or an identical orientation. The passage openings may thus form small unit cells which contribute additively to the deformation behavior. In particular, the passage openings may be formed by a lattice of at least similarly elastic walls extending in the longitudinal direction. Advantageously, the passage openings may extend duct-like in the longitudinal direction. The passage openings may in each case have a constant cross-section over the length or parallel to the longitudinal direction. In the lattice, the inner walls may be connected to one another and to the elastic outer wall having the clamping surface. In particular, the elastic walls per se may be connected to one another and converge at connecting lines which extend at least approximately in the longitudinal direction. The connecting lines may be nodal lines of the lattice which, in cross-section, appear to be nodal points. At least the predominant proportion of the elastic walls of the at least one clamping part may here have an identical wall thickness.

The lattice structure of the walls may be honeycomb-like. The lattice structure of the walls is preferably of regular, in particular uniform, construction. In this way, the elastic wall having the clamping surface may have identical or at least similar deformation behavior over its lateral extent transversely of the longitudinal direction. This favors universal use of the strain reliever with regard to the supply lines. The deformation behavior may be more readily calculated and planned on the basis of the lattice structure. The various steps, for example also in the case of an additive manufacturing process, such as configuring and making up the strain reliever with the supply lines, may thus more readily be automated.

In a further development of the strain reliever, in particular in the case of a uniform cavity or lattice structure, the passage openings may in each case have the shape of a right prism with a polygonal base area of preferably identical sides. Alternatively, the passage openings may in each case have the shape of a right cylinder with a round base area in particular as a partial cylinder with a continuous round or semicircular cross-section. The right cylinder may be a circular cylinder, a cylinder with an oval base area or for example a cylinder with an elongate round base area. It goes without saying that the passage openings need not necessarily all be of identical configuration. It has, however, also proved advantageous, also due to the more uniform force transmission and deformation, to arrange the passage openings regularly or in a specific "pattern" in which they and/or possible "blank spaces", i.e. locations without a passage opening, have an at least similar cross-section.

In one embodiment of the strain reliever, the passage openings may in cross-section have the shape of a right prism with a triangular base area. On the basis of geometry, such a right prism with a triangular base area has a wedge shape with linear crests which, in the triangular base area, in each case forms a vertex of the triangle. This wedge shape is particularly favorable for transmitting forces and counteracts unwanted twisting of the clamping part for example as a result of an asymmetric distribution of the supply lines in the strain reliever.

In particular, the triangle of the base area in one group of passage openings may be arranged with one vertex pointing contrary to the clamping direction and in another group pointing in the clamping direction. Advantageously, the passage openings of the one group may, with regard to a transverse direction, be arranged in a row perpendicular to the longitudinal direction and the clamping direction and alternately to the passage openings of the other group and with regard to the transverse direction. In particular, the passage openings may be arranged in alignment with one another in the transverse direction.

If, as described above, the passage openings adjoin another they may form with their elastic walls a uniform elastic lattice of mechanically stable, for example triangular, lattice units in which deformation forces are transmitted. In particular if the triangle is equilateral, the distribution of forces and the course of deformation in the elastic lattice may be at least roughly estimated, for example using the finite element method, and thus more readily predetermined. This may also relate to the elastic wall having the clamping surface.

In particular, the passage openings of the group with the vertex pointing contrary to the clamping direction may be bounded by the elastic wall having the clamping surface or a corresponding portion of said clamping surface.

This has the consequence that the inner walls of the passage openings of both groups touch the elastic wall having the clamping surface. The passage openings with the linear crest pointing contrary to the clamping direction are here in each case bounded, on their side surface opposite the crest, by the elastic wall having the clamping surface. The inner walls of the passage openings with the linear crest pointing in the clamping direction furthermore touch this crest on the elastic wall having the clamping surface. In this way, the clamping surface may be linearly supported at these points and thereby stiffened or reinforced.

The arrangement of the passage openings or inner walls in alignment with the transverse direction implies that the passage openings with the crest pointing in the clamping direction may, on their side surface opposite this crest, in each case form an elastic wall extending in the transverse and the longitudinal direction. The passage openings may then in each case touch this wall with their crest pointing contrary to the clamping direction, whereby said wall may be stabilized and stiffened. In order to form this elastic wall, the lattice structure of elastic walls contrary to the clamping direction may be continued over the arrangement of the passage openings in alignment with the transverse direction. The lattice structure is preferably continued unchanged. In particular, the lattice structure of a clamping part is uniform, preferably uniform in the cross-section perpendicular to the longitudinal direction.

The portions of the elastic wall of the clamping surface which, between the locations at which the passage openings of the group with the crest pointing in the clamping direction, are in each case connected linearly by the crest to the elastic wall, may be configured with a curvature contrary to the clamping direction to form a receiving groove. The receiving groove may act as an orientation aid for properly or uniformly distributed placement of the supply lines in the strain reliever. The receiving grooves are to this end preferably uniformly distributed transversely of the longitudinal direction.

In particular, the base area of the wedge-shaped passage openings may in each case have an internal angle of less than 60°, in particular less than or equal to 45° or less than or equal to 30°. The sides or inner walls bounding these internal angles may preferably be of equilateral configuration. As a consequence, the passage opening obtains a slimmer, wedge-like shape, wherein the equilateral sides converge to the crests forming the vertices which, in cross-section, point in or contrary to the clamping direction. In this way, the walls forming the crest extend further in the clamping direction than in the case of an equilateral triangular base area. As a consequence, the cavity structure may be further stabilized with regard to absorption of forces, so counteracting any unwanted deviation of the cavity structure in the transverse direction.

It has proved advantageous for the passage opening inner walls which extend with a major component in the clamping direction to be of arcuate configuration. As a consequence, bending of the passage openings on deformation can be predetermined. Furthermore, the spring system may be extended by a further elastic spring component by bending. For reasons of symmetry of forces, it is advantageous for these elastic walls to be embodied in pairs with regard to the transverse direction and in each case with an opposing curvature in the pair.

In a further development, the passage openings may in a honeycomb-like arrangement in at least two mutually parallel rows. One row or both rows may define the clamping surface. With regard to a transverse direction, the rows may extend in honeycomb-like manner perpendicular to the longitudinal direction and the clamping direction. Honeycomb-like here in particular means that the passage openings of the one row at least partially overlap with those of the other row with regard to the transverse direction and/or the clamping direction. The passage openings of the respective row may also be arranged in alignment with one another with regard to the transverse direction and/or the clamping direction. A honeycomb structure with a periodic, regular or uniform arrangement of the passage openings may be provided, but not necessarily for example with a hexagonal basic shape.

In particular in the case of a honeycomb-like arrangement of passage openings with a hexagonal base area, a clamping surface with receiving grooves may be configured as a result of the one row projecting beyond the other in the clamping direction, each of which grooves, bounded by three passage openings, has a semihexagonal cross-sectional shape. Accordingly, in the case of a honeycomb-like arrangement of passage openings each having a rhomboidal base area, V-shaped receiving grooves may be configured, each of which is bounded by two pas sage openings.

The passage openings associated with the clamping surface are preferably arranged in a volume portion of the block-like clamping part. The volume portion may be defined by the clamping surface and at least one portion of a total height of the clamping part starting from the clamping surface and perpendicular thereto. In particular, at least some of the passage openings of the other row, in each case passing laterally between two passage openings of the one row, may linearly touch the clamping surface.

In general, with the supply lines clamped in place between the clamping surfaces, the strain reliever may in operation be exposed to elevated tensile forces acting in the longitudinal direction. Depending on the nature and/or distribution of the supply lines, these may additionally act asymmetrically on the strain reliever. This results in a risk of the clamping parts twisting about the longitudinal axis and bending about a bending axis parallel to the clamping direction and/or about a bending axis parallel to the transverse direction. In order to counter this risk, stiffening, in particular by at least one further inner wall, may be provided at certain points and regions of the clamping part. Elasticity may be purposefully reduced by such stiffening. The above-described spring system may in this way be made harder with regard to resilience.

Certain passage openings may to this end be stiffened with a wall which divides them in the longitudinal direction, in each case for example by means of internal bracing which divides the cross-section. Stiffening may be achieved by thickening the bounding wall, reducing the cross-sectional area and/or by omitting passage openings.

It may in particular be provided that transverse bracing which extends over the length of the clamping part and in the transverse direction is provided in a central region with regard to the longitudinal direction. This transverse bracing may have a plate-like shape which offers an increased moment of resistance to bending about the bending axis parallel to the clamping direction.

Furthermore, transverse bracing extending over the length of the clamping part and in the clamping direction may preferably be provided in a central and/or end region perpendicular to the longitudinal direction and clamping direction with regard to the transverse direction. This transverse bracing may likewise have a plate-like shape which offers an increased moment of resistance to bending about the bending axis parallel to the transverse direction. This transverse bracing furthermore softens the transition, so reducing wear, of the resilient system to provided retaining regions of the clamping part for holding and fixing the latter in the clamping apparatus with regard to the force curve.

The wall thickness of the transverse bracing may here in particular be greater than the wall thickness of the outer wall having the clamping surface and/or the inner walls.

In a preferred embodiment, the clamping part is of mirror-symmetrical construction with regard to a main plane which extends perpendicular to the longitudinal direction and clamping direction with two lateral, elastic walls which are bounded by a symmetrical cavity structure and provide clamping surfaces. The above-stated transverse bracing may here lie in or form the plane of symmetry as a kind of center brace.

In a further development of the strain reliever, the clamping surface may have at least one or more receiving channels for accommodating supply lines in particular with a relatively large cross-section. The cross-section of the receiving channels may in each case preferably be defined solely by the passage openings adjoining the respective receiving channel. In contrast with the above-described receiving grooves, the receiving channels in each case have a depth which is up to a multiple greater than the average diameter of the respective passage opening which bounds it.

These additional receiving channels are in each case introduced from the clamping surface without cutting the adjoining passage openings. Advantageously, due to possible jamming of the supply line placed in the receiving channel and thus resilient tension of the passage opening adjoining the receiving channel, the receiving channels may be of wedge-shaped tapering configuration contrary to the clamping direction. This is possible, for example, in the case of passage openings with a triangular or rhomboidal base area.

In particular, the clamping part may have a further clamping surface which is arranged remote from and parallel to the one clamping surface of the clamping part on the latter. For convenience of fitting, the two clamping surfaces may be identically configured. A simple embodiment in this respect is for example mirror-symmetrical to the main plane of the clamping part.

A group of preferably identical passage openings may be associated with each clamping surface. To this end, the group of a clamping surface may be arranged following on from one another with regard to the clamping direction indirectly via a region without passage openings or directly after the passage openings associated with the further clamping surface. The region without passage openings forms transverse bracing of the kind already described above which brings about an increase in twisting resistance or in general a stiffening of the clamping part. This transverse bracing is preferably arranged in a central fraction or precisely centrally.

In the event of the two groups directly adjoining, they may preferably be indistinguishable, i.e. merge into one another without disruption of a uniform or regular opening structure.

The clamping part is preferably of one-piece configuration and in particular produced entirely from one material. The preferred material is an elastic plastics material, in particular a non-porous thermoplastic elastomer. The clamping part may be produced for example by injection molding or in an additive method. Production by an injection molding method is preferred.

The clamping apparatus may, without wishing to limit it thereto, for example have a per se known receiving frame, in which the clamping part or clamping parts are mounted to be displaceable solely in the clamping direction and are arranged pressably in the clamping direction.

One suitable clamping apparatus which may in particular be considered is an apparatus according to DE 20 2017 102 147.

In a further development, the strain reliever may have at least one further clamping part, wherein, in the installation position, the two clamping parts are arranged in the strain reliever with their clamping surfaces opposite and pressable against one another. The two clamping parts are preferably of identical construction. A number of clamping parts are typically used, wherein the clamping parts need not necessarily be but are preferably embodied as identical standard parts, so simplifying fitting and inventory management. The lines are then clamped in place, in each case between two opposing clamping parts, in a plurality of planes.

As is known from the above-stated prior art, the clamping part or clamping parts may in each case have, in order to retain and guide it/them in the receiving frame provided in the clamping apparatus, a retaining region at both ends with regard to the transverse direction and, therebetween, a clamping region having the clamping surface.

With regard to the clamping parts being stably seated in the receiving frame, the clamping parts may be connected to one another in the clamping direction in particular via a plug-in connection. To this end, the clamping part may, in both retaining regions on the side having the clamping surface, in each case have a plug-in projection which in the installation position extends in the clamping direction and, on the side remote therefrom, a plug-in opening which is appropriately adapted to the plug-in projection and is let in in the clamping direction into the respectively associated retaining region. The plug-in projection and, adapted thereto, the plug-in opening are preferably of conically tapered configuration in the clamping direction.

According to the invention, an end-fastening part of a guideway device or energy chain may be equipped with a strain reliever according to one of the embodiments described previously and below. The strain reliever may here with regard to its extent in the transverse direction and in the clamping direction be arranged perpendicular to the longitudinal extent of the end-fastening part and thus perpendicular to the longitudinal extent of the energy chain.

A number of clamping parts are here preferably held in a frame. The clamping parts are preferably fitted perpendicular, i.e. in an orientation with substantially perpendicularly extending clamping surfaces. This has the advantage that all the lines may be made more readily accessible, for example for maintenance purposes, than in a horizontal stack (cf. FIG. 1).

In particular, the end-fastening part may conventionally have a connection port for connection to the supply line, which port is adapted to the supply line device which is to be connected, in particular to a guideway device or energy chain. Without wishing to be limited thereto, since numerous other structural solutions are possible, the connection port may for example have two side parts spaced from one another in the transverse direction.

In the case of an energy chain, i.e. a supply line device of pivotable chain links with side straps, it may be provided that the side parts are configured as connecting side straps adapted to the side straps to which the chain link to be connected to the end-fastening part is pivotably connectable by its side straps.

The proposed strain reliever is particularly well suited to use in energy chains in which various lines with differing diameters are very typically guided.

The invention also relates to a clamping part per se for a strain reliever. A generic clamping part is made in one piece from an elastic plastics material, in particular from a TPE by an injection molding method, and has two opposing side surfaces, each of which, for strain relief, comprises a clamping surface for clamping at least one supply line in place against a further clamping surface.

According to the invention, an elastic wall is provided at least in the region of the clamping surface intended for clamping the supply lines in place, which wall bounds a cavity structure on the side remote from the clamping surface, wherein this cavity structure is formed by a lattice-like arrangement of a number of further elastic walls which are connected in one piece to the first elastic wall.

The clamping part is preferably of mirror-symmetrical construction with regard to a main plane perpendicular to the clamping direction, such that rotational orientation is of no concern during fitting.

In the main plane, the clamping part preferably has transverse bracing which extends over a main dimension and is connected in one piece to the lattice-like arrangement of walls.

In an embodiment which is simple to produce by an injection molding method, the cavity structure has a plurality of passage openings extending in the longitudinal direction which extend at least predominantly or completely continuously in or approximately in the longitudinal direction through the clamping part. A predominantly continuous extent here passes through at least 50% of the dimension of the clamping part in the longitudinal direction. The cavity structure is here preferably of honeycomb-like construction, i.e. the elastic walls form cell walls which bound the passage openings perpendicular to the longitudinal direction.

In one embodiment which is favorable with regard to distribution of forces, the lattice-like arrangement has walls arranged in pairs, wherein opposing walls in each pair in each case have an opposing curvature. The walls may here taper inwardly, i.e. bound an interposed passage opening which has a cross-sectional shape which tapers to a point contrary to the clamping direction or away from the elastic wall having the clamping surface. The walls in each pair preferably merge at the end region remote from the clamping surface in one piece into the transverse bracing.

At least one projection and/or indentation serving to be held form-fittingly in a frame of a clamping apparatus, for example according to DE 20 2017 102 147, may be provided on each of two opposing narrow sides of the clamping part, which are located perpendicular to the side surfaces. The projection and/or indentation may here extend in the clamping direction or transversely of the longitudinal direction.

The clamping parts according to the invention are particularly suitable for use in a strain reliever with a plurality of supply lines, in particular in a strain reliever of an energy chain, or also in a strain reliever in the housing of a plug-in connector, in particular of a rectangular plug-in connector having a plurality of plug inserts.

BRIEF DESCRIPTION OF THE DRAWINGS

Further details and advantages of the invention are apparent, without the scope of protection being limited, from the description of preferred embodiments with reference to the appended drawings. In the figures:

FIGS. 2b and 2c in each case show a view of an end-fastening part having the strain reliever according to the invention according to FIG. 2a;

FIG. 3a shows a side view of a further embodiment of the clamping part;

FIGS. 3b and 3c in each case show a side view of two clamping parts according to FIG. 3a stacked on one another, respectively without and with supply lines which are clamped in place;

FIG. 3D shows an enlarged partial view of FIG. 3a corresponding to region IIId;

FIGS. 4a-4d in each case show a view of a further embodiment of the clamping part;

FIGS. 5a-5d in each case show a view of a further embodiment of the clamping part;

FIGS. 6a-6d in each case show a view of a further embodiment of the clamping part;

FIG. 8a shows a side view of a further embodiment of the clamping part;

FIGS. 8b and 8c in each case show a view of two clamping parts according to FIG. 8a stacked on one another, respectively without and with supply lines which are clamped in place;

FIGS. 12a and 12b show a particularly preferred embodiment of a clamping part according to the invention, in each case in front view and in perspective view;

FIG. 13 shows a front view of a preferred strain reliever for energy chains; and FIG. 14 shows a longitudinal section of a plug housing on an industrial rectangular plug-in connector with two clamping parts according to the invention for strain relief.

DETAILED DESCRIPTION

Figure 1:
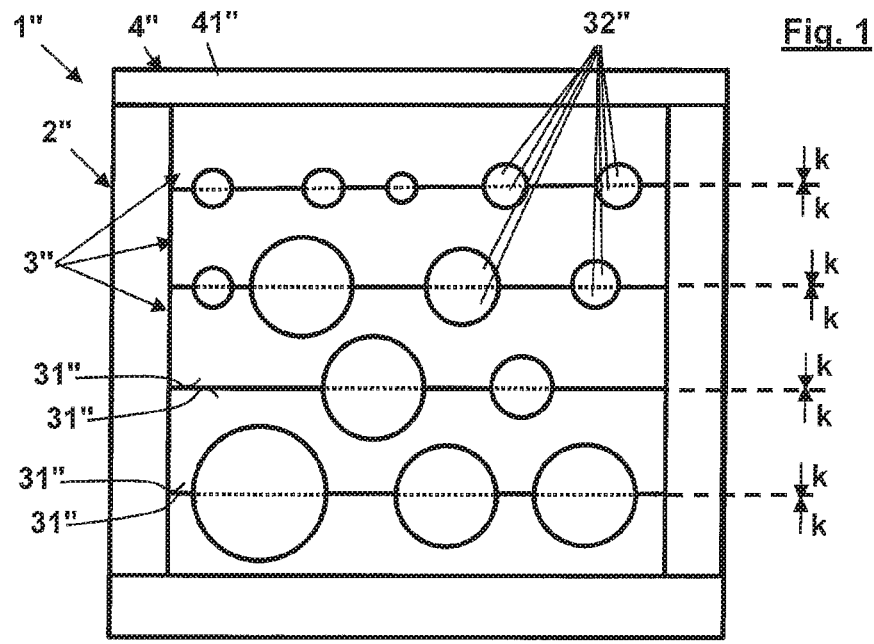
FIG. 1 shows a side view of a strain reliever known from the prior art having a plurality of clamping parts stacked on one another.
Figure 2A:
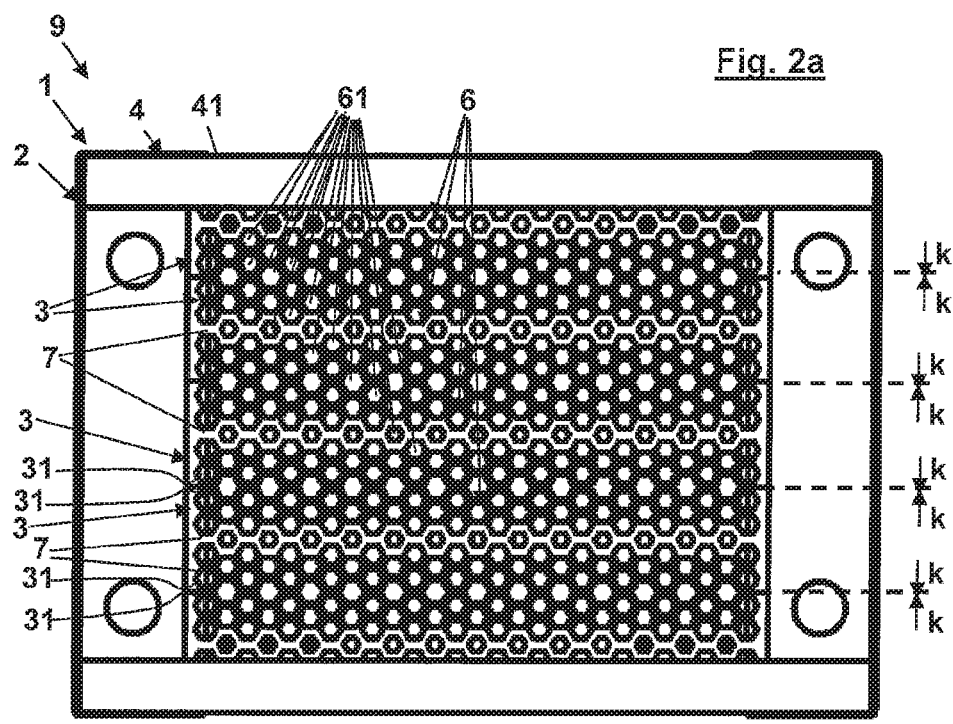
FIG. 2a shows a side view of an embodiment of a strain reliever according to the invention having a plurality of clamping parts.

FIG. 1 shows a strain reliever 1", which is known from the applicant's catalog "igus Katalog e-ketten und-systeme 2015", page 1175 and thus forms the prior art, for supply lines V, shown by way of example in FIG. 3c, of a supply line device not shown in further detail here. FIG. 2 shows a corresponding view of the strain reliever 1 according to the invention. The reference signs for the components of the strain reliever 1" according to the prior art additionally bear a double quotation mark to distinguish them from those according to the invention. The strain reliever 1; 1" has a clamping apparatus 2; 2", in this case with five block-like clamping parts 3; 3" stacked on one another. The clamping parts 3; 3" have at least one side surface configured as a clamping surface 31; 31" for clamping the supply lines V in place against a further clamping surface 31; 31" of the clamping apparatus 2; 2". The strain reliever 1; 1" is here designed for passage of the supply lines in a longitudinal direction 1 perpendicular to the clamping direction k, wherein in FIGS. 1 and 2 the longitudinal direction 1 is in each case arranged perpendicular to the image plane. The clamping parts 3; 3" stacked on one another lie with their clamping surfaces 31; 31" pressed against one another in the clamping direction k. They are displaceably guided in the clamping direction k in a receiving frame 4; 4". The upper crosspiece 41; 41" in the receiving frame 4; 4" according to FIGS. 1 and 2a can be pressed via a connection, not shown here, in the clamping direction k against the clamping parts 3; 3" in order to clamp the supply line V in place. The invention is, however, not solely limited to this structural possibility for fixing the clamping parts 3 in the strain reliever 1.

In the prior art, the clamping part 3" is a compact solid body. Semicircular receiving channels 32" are cut into the clamping surfaces 31" of the clamping part 3", which channels, in the installation position, are complemented by the corresponding receiving channels 32" of the associated clamping surface 31" of the adjacent clamping part 3" to form a circular receptacle in each case for one supply line. As is clearly apparent, such a circular receptacle is provided for each of the supply lines, wherein said receptacle is individually adapted to the diameter of the respectively associated supply line.

In contrast, the invention provides that the clamping surface 31 is formed, at least in a clamping portion 33 intended for clamping the supply lines V in place, by an elastic wall 50, wherein on the side remote from the clamping surface 31, the elastic wall 50 bounds a cavity structure 6 extending in the longitudinal direction 1 through the clamping part 3. This is apparent by way of example from FIG. 3d, an enlarged detail from FIG. 3a, wherein the longitudinal direction 1 extends perpendicular to the plane of the drawing. Due to this measure, when a supply line V is clamped in place, the clamping surface 31 can be extended flexibly into the cavity structure 6, whereby it acts in a similar manner to a leaf spring clamped at both ends, storing spring energy on extension which acts in the form of a restoring force on the supply line V which is clamped in place.

As is apparent from FIGS. 2-11, in the embodiments according to the invention of the strain reliever 1 shown here, the cavity structure 6 is defined by a plurality of to numerous passage openings 61 extending in the longitudinal direction 1, at least some of which are bounded by the elastic wall 50 which has the clamping surface 31. The passage openings 61 furthermore adjoin one another via elastic inner walls 52. The latter form a lattice of at least similar elastic walls 52 extending in the longitudinal direction 1. The passage openings 61 are in each case of duct-like configuration and exhibit no change in cross-section over the length of their extent (perpendicular to the plane of the drawing with regard to FIGS. 3a-3c). Depending on the respective opening cross-section, the passage openings 61 consequently have a columnar or cylindrical or pillar-like or prismatic shape.

The passage openings 61 are thus laterally bounded by elastic walls 50, 52. Since at least some are simultaneously bounded as part of the cavity structure 6 by the elastic wall 50 which has the clamping surface 31, the elastic walls 50, 52, i.e. the elastic wall 50 having the clamping surface 31 and the further walls 52 bounding the passage openings 61, form an elastic lattice in which the individual elastic walls 50, 52 are connected together at specific points. This elastic lattice of walls 50, 52 forms a spring system which is purposefully deformed when supply lines V are clamped in place and generates a restoring force on the respective supply line V to fix the latter between two clamping surfaces 31 of the clamping apparatus 2. The supply lines V are thus frictionally fixed in the strain reliever 1 and are held by static friction. FIGS. 3a-3d show this procedure by way of example on the clamping part 3 with a cavity structure 6 which has passage openings 61 in each case with a hexagonal cross-section, such that the walls 50, 52 bounding the passage opening 61 form the shape of a right hollow prism with a hexagonal base area. The walls 50, 52 of the passage openings 61 adjoin one another in each case at the corners of the hexagon to form an elastic latticework.

FIG. 3a shows an individual representation of an embodiment of the clamping part 3. In FIG. 3b, two clamping parts 3 are arranged opposite one another at the mutually associated clamping surfaces 31 without supply lines being clamped in place between the clamping surfaces 31. It is clearly visible that the adjoining passage openings 31 here form a continuous hexagonal structure. In FIG. 3c, two supply lines V with different cross-sections are frictionally fixed between the clamping surfaces 31, wherein the clamping surfaces 31 are elastically extended and the elastic walls 50, 52 between the passage openings 31 are deformed. It is clearly visible that the deformation of the wall 50, which defines the clamping surface 31, is at its greatest and that the deformation of the inner walls 52 declines distinctly contrary to the clamping direction k. The passage openings 61 of the lattice may thus be viewed as small unit cells which cumulatively contribute to the deformation behavior. The plate-shaped elastic walls 50, 52 are connected together at nodal lines 54 of the lattice which, in cross-section, appear to be nodal points.

It is furthermore clear that the elastic latticework of walls 50, 52 responds as a whole to the deformation and thus forms a kind of cohesive deformation continuum. Specific deformation behavior of the elastic lattice may be purposefully preset inter alia by shaping. This may proceed by means of the configuration and density of the passage openings 31 per unit area, the wall thickness of the elastic walls 50, 52, the material-specific elasticity of the walls 50, 52 and optionally the provision of regions without passage openings for reinforcing or stiffening the clamping part. In particular, specific resiliently soft or hard behavior may be set. This behavior may be preset in such a manner that the strain reliever 1 can be put to versatile use, wherein it may be designed to be suitable for a specific bandwidth of supply line cross-sections and/or types. The behavior may also be set such that the strain reliever 1 is specified to specific customer requirements.

Figure 10A:
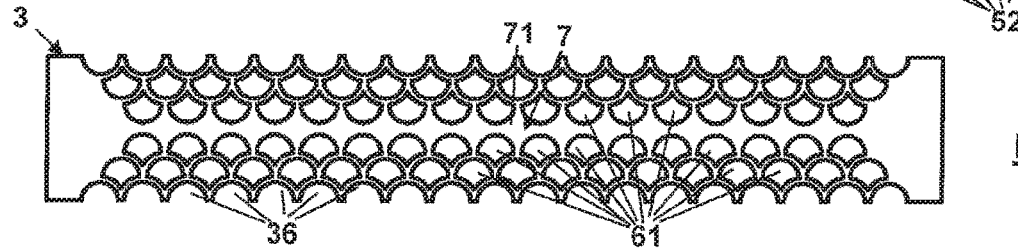
FIGS. 10a and 10b in each case show a view of a further embodiment of the clamping part.
Figure 10B:
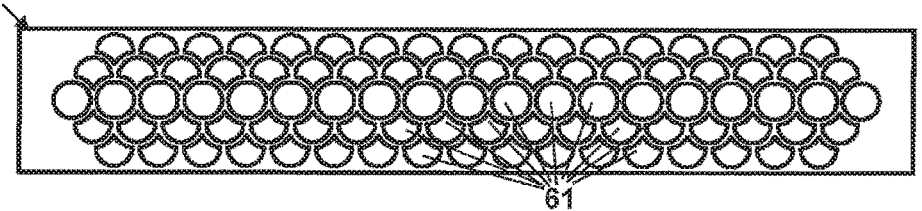

With the exception of the embodiments of the clamping part 3 shown in FIG. 10b, the wall thickness of the wall 50 defining the clamping surface 31 and the wall thickness of the walls 52, via which the passage openings 61 adjoin one another, are of identical size. The wall thickness of the elastic wall 50 or elastic walls 52 is here for example somewhat less than or equal to one sixth of an average diameter as defined further above of the adjoining passage openings 61.

In addition, the passage openings 61, like the passage openings 61 of the cavity structure 6 of the strain reliever 11 according to FIGS. 4 and 7-10, are arranged in a honeycomb. Honeycomb here in particular means that passage openings 61 partially overlap in the transverse direction q and in the height direction h. The height direction h is here parallel to the clamping direction k. The passage openings 61 extend in parallel rows to the transverse direction q.

As a result of the overlap in the transverse direction q, receiving grooves 36 uniformly spaced in the transverse direction q are formed on the clamping surface 31 by the wall 50, which grooves may serve as an orientation aid or grid during placement of the supply lines V in the longitudinal direction 1 in the clamping apparatus 2. The size of the opening cross-section of the receiving grooves 36 is determined by the size of the hexagonal opening cross-section of the passage openings 61 and here has a semihexagonal cross-sectional shape. The passage openings 61 associated with the clamping surface 31 are here congruent or have an identical size, an identical cross-section and an identical orientation.

In general, the clamping parts 3 have a retaining region 34 at both ends with regard to the transverse direction q for non-rotatable and longitudinally displaceable arrangement in the receiving frame 4 shown in FIG. 2 of the clamping apparatus 2 and, arranged between the retaining regions 34, a clamping region 35 having the clamping surface 31 and the cavity structure 6.

Transverse bracing 7 in the form of a continuous crosspiece 71 extending in the transverse direction q over the entire clamping region 35 is clearly apparent in FIGS. 3a-3c. Said crosspiece extends as a plate in the transverse direction q over the entire longitudinal extent of the clamping part 3. In this way, as described further above, the tensile forces introduced in the direction of the strain reliever 1 by the supply lines V can be better transferred in a mechanically favorable manner. The wall thickness of the transverse bracing 7 is here approximately identical to that of the walls 50, 52.

Figure 11:
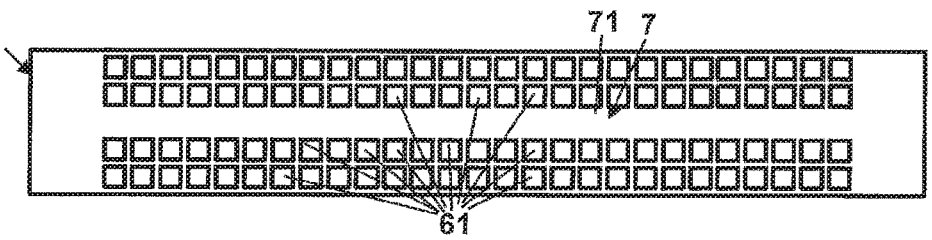
FIG. 11 shows a side view of a further embodiment of the clamping part.

The transverse bracing 7 may, like the walls 50, 52, be of elastic configuration so as not excessively to impair elastic deformation behavior. However, since the transverse bracing 7 is centrally arranged in the height direction h, divides the central passage openings 61, here for example halving them, it simultaneously provides stiffening of the cavity structure 6 whereby the deformation of the elastic lattice of walls 50, 52 declines correspondingly at this point. Transverse bracing 7 is in each case also provided in the embodiments of the strain reliever according to FIGS. 5a-5d, 6a-6c, 8a-c, 9a-9c, 10a-10b and 11, either by a crosspiece 71 (FIGS. 5a-5d, 6a-6c, 8a-8c) or alternatively by a central region devoid of passage openings 61 (FIGS. 10a and 11). It is also possible to act purposefully on the deformation behavior, in particular on the torsional stiffness, and correspondingly on the spring behavior of this elastic lattice by such stiffening.

In the embodiments of the strain reliever 1 according to FIGS. 4d and 10, modified deformation behavior is achieved by a central row of passage openings 71 being provided which have a greater cross-section than the other passage openings 71, wherein both are of similar honeycomb-like shape in FIG. 4d. In FIG. 4d, pronounced thickened portions 72 are furthermore provided between these central passage openings 71 for stiffening with regard to the transverse direction q.

FIGS. 5a-5d and 6a-6d show another option for the arrangement and shape of the passage openings 61. The passage openings 61 here have the shape of a right prism with a triangular base area and bound an elastic lattice. As is in particular apparent from FIG. 5d, an enlarged detail Vd from FIG. 5a, such a right prism with a triangular base area has a wedge shape with linear crests 62. This shape is particularly favorable in mechanical terms.

The passage openings 61 are arranged with different orientation with regard to the clamping direction k: in one group of passage openings 61, the crest 62 is arranged pointing contrary to the clamping direction k, while the crest 62 in the other group 61 is arranged pointing to the clamping direction k. The passage openings 61 of the two groups are arranged with regard to the transverse direction alternatingly and in alignment with one another.

The passage openings 61 of the group with the crest 62 pointing contrary to the clamping direction k are furthermore bounded by the elastic wall 50 of the clamping surface 31. In other words, the side surface 63 opposite the crest 62 is bounded by this elastic wall 50. The crest 62 of the passage openings 61 of the other group touches the elastic wall 50 of the clamping surface 31. The clamping surface 31 is thus linearly supported at these points and thus stiffened. The passage openings 61 of both groups touch the elastic wall 50 which has the clamping surface 31.

The lattice structure of the walls 52 is continued contrary to the clamping direction k up to a further clamping surface 31 of the clamping part 3 in such a manner that the passage openings 61 of both groups also touch an in this case central elastic wall 52 parallel to the elastic wall 50 having the one clamping surface 31 to form a crosspiece 41. The lattice structure furthermore repeats between the central clamping surface 31 and the further wall 52.

Between the points at which the clamping surface 31 touches the other group via the crest 32 of the passage openings 61, the clamping surface 31 is configured with a curvature contrary to the clamping direction k, in each case forming a receiving groove 36, as an orientation aid for proper placement of the supply lines.

In one particularly preferred further development according to FIGS. 6a-6d, the inner walls 52, extending with a major component in the clamping direction k, of the passage openings 61 are of arcuate configuration. As is apparent from FIGS. 6a-6d, this gives rise of a mechanically favorable barrel vault-like or pointed vault-like arrangement of these walls 52. Due to symmetry of forces, these walls 52 are arranged in pairs with regard to the transverse direction q, wherein in each case walls 52 with an opposing curvature are provided in each pair.

According to FIGS. 5a-6a, plate-like transverse bracing 7 is provided at both ends in the transverse direction q, which bracing extends over the height h parallel to the clamping direction k and over the length 1 of the clamping part 3. This transverse bracing 7 offers an increased moment of resistance to bending about the bending axis parallel to the transverse direction q.

Honeycomb-like mutually adjoining passage openings 61 with a rhomboidal cross-section are provided as the cavity structure 6 in FIGS. 7a-7d and 8a-8c. There is a considerable difference with regard to the size of the opening cross-sections in FIGS. 7a and 7b, wherein the cavity structure 6 with larger rhomboidal passage openings 61 is softer in terms of spring mechanics than that with smaller rhomboidal passage openings 61. As a result of the honeycomb-like arrangement of the passage openings 61, V-shaped receiving grooves 36, in each case bounded by two passage openings 61, are here configured on the clamping surface 31.

FIGS. 9a-9c and 10a-10b show further variations with regard to the shape of the opening cross-section of the passage openings 61. These are in this case made up of semicircles or complete circles, wherein the passage openings 61 have a right cylindrical shape defined by the opening cross-section. Here too, the passage openings 61 are in a honeycomb-like arrangement. Determined by the cross-sectional shapes of the passage openings 61, receiving grooves 36 are also provided here, wherein the passage openings 61 bounding the receiving grooves 36 curve outwards laterally convexly (FIGS. 9a-9c) or laterally concavely (FIGS. 10a-10b).

In FIG. 11, the passage openings 61 have a square opening cross-section and are arranged not in honeycomb manner with regard to the transverse direction but instead juxtaposed.

For example, if those cases in which very large differences in line cross-section of the supply lines V have to be taken into account for fixing, it is possible, as shown in FIGS. 8a to 8c, additionally to make in this case V-shaped incisions contrary to the clamping direction k in the clamping surface 31. Since, in comparison with the size of the cross-sectional area of the passage openings 61 of the respective embodiment of the strain reliever 1, said incisions are a multiple larger than a receiving groove 36 as describe above, they are here denoted receiving channels 32. These incisions are made are along the flexible walls 52 of the bounding passage openings 61 without laterally opening one of passage openings 61.

In order to strengthen proper retention of the clamping parts 3 in the clamping apparatus 2 in the installation position, a mechanical connection provided in the retaining region 34 is provided between the clamping parts 3 stacked on one another, as is shown by way of example in the embodiment of the strain reliever 1 according to FIGS. 6a-6c. The mechanical connection is here configured as a plug-in connection 8 with a mutually adapted plug-in projection 81 and plug-in opening 82. In the installation position, the plug-in projection 81 of one clamping part 3 extends in the clamping direction k and engages form-fittingly in the clamping direction k into the associated plug-in opening 82 of the clamping part 3 adjacent to the clamping part 3 in the clamping direction k.

Figure 2B:
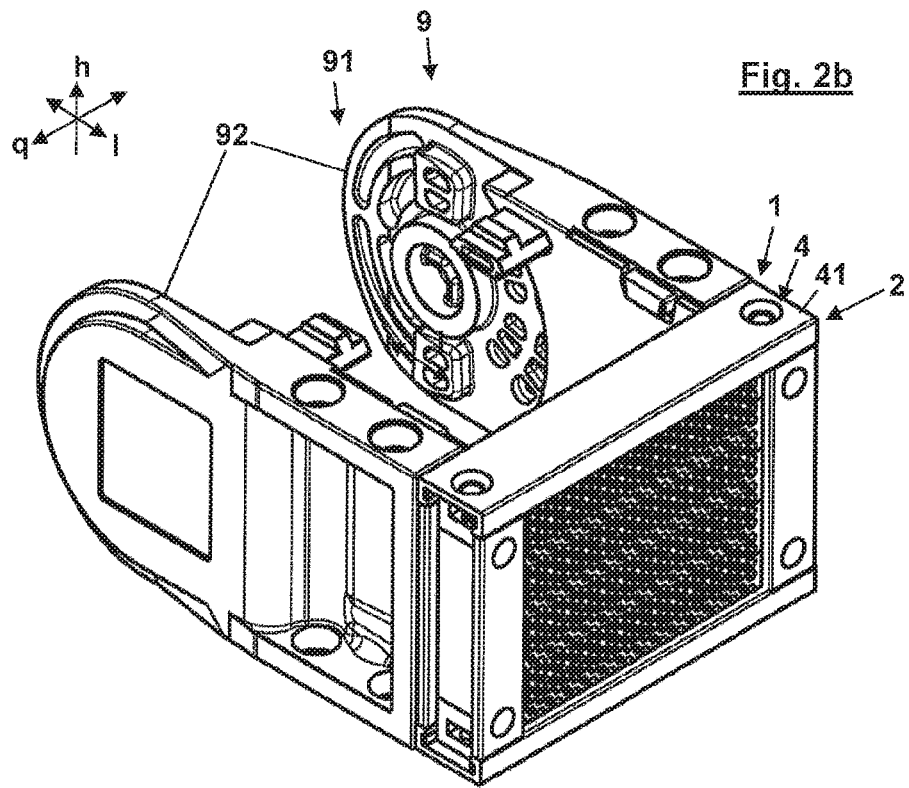
Figure 2C:
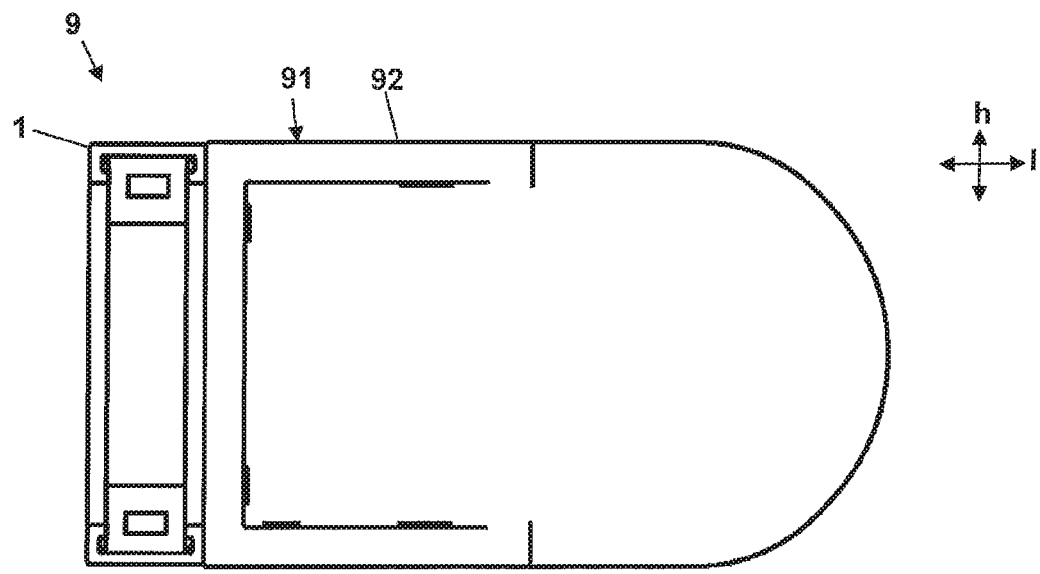
Figure 7A:
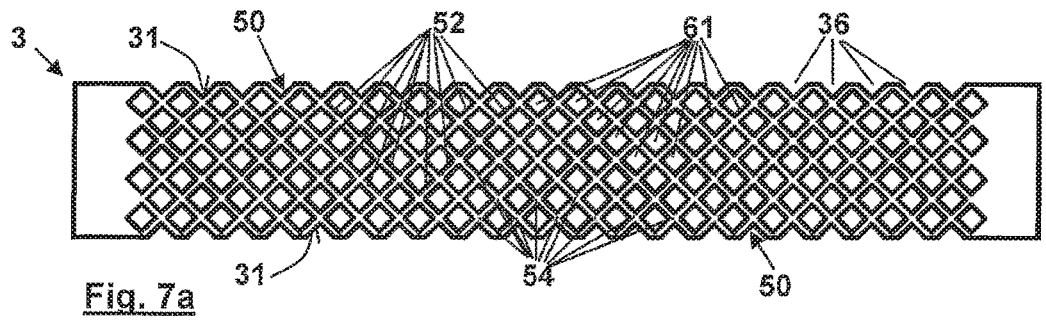
FIGS. 7a-7d in each case show a view of a further embodiment of the clamping part.
Figure 7B:
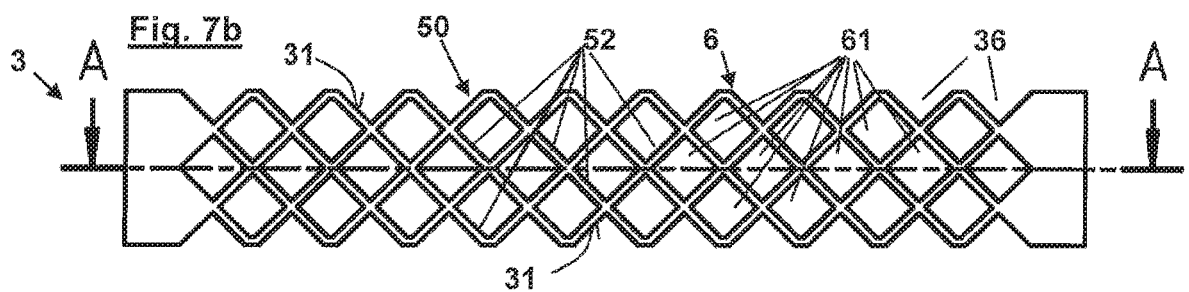
Figure 7C:
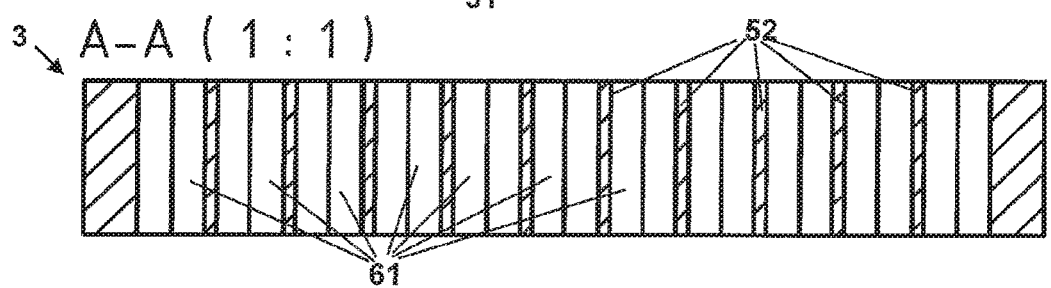
Figure 7D:
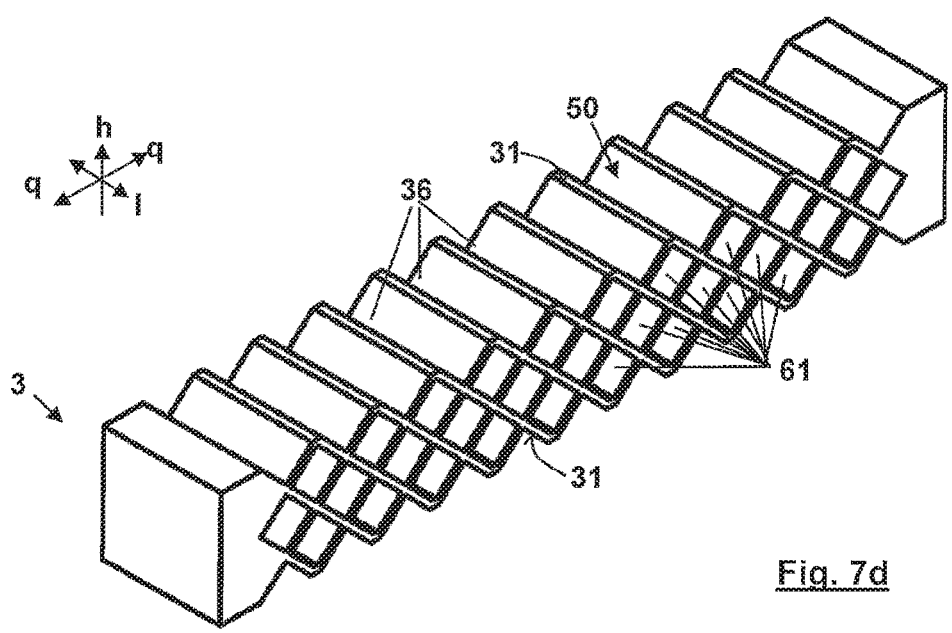
Figure 9A:
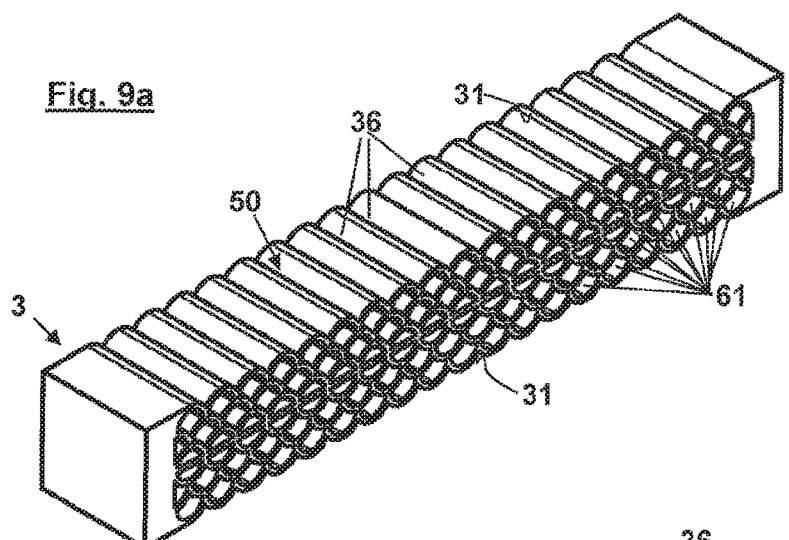
FIGS. 9a-9c in each case show a view of a further embodiment of the clamping part.
Figure 9B:
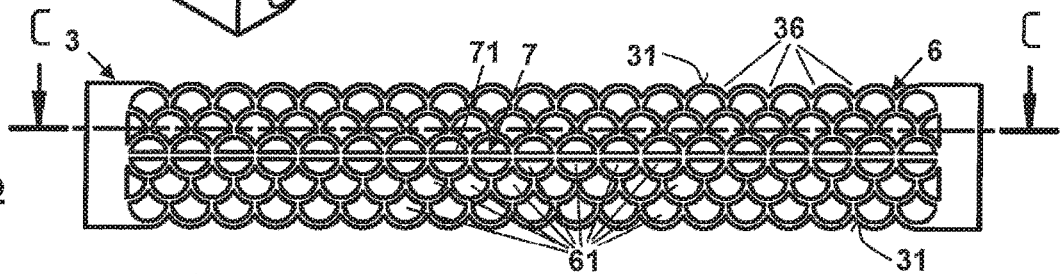
Figure 9C:
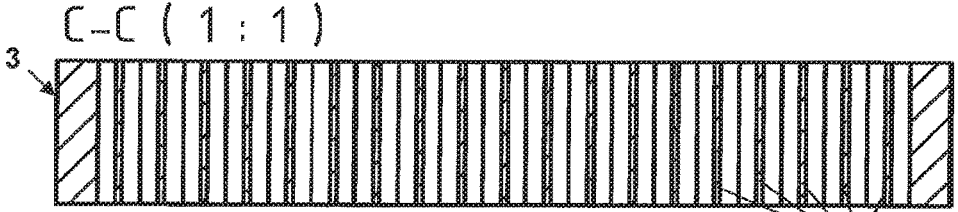

The strain reliever 1 is part of an end-fastening part 9 shown in FIGS. 2a and 2b. For connection to the supply line device, the end-fastening part 9 has a connection port 91 which, as in the embodiment shown, is designed for a per se known supply line device of chain links with side straps. Two connecting side straps 92 which are adapted to the side straps and define the outside are therefore provided. Since these connecting side straps 92 are adapted and may thus also have shapes other than that shown in FIG. 2b, the connecting side strap 92 visible in FIG. 2c is shown merely as an outer contour which omits internal contours.

FIGS. 12a-12b show a particularly preferred embodiment of a clamping part 300 which has a geometry of the cavity structure 6 and an outer elastic wall 50 with a corrugated profile, similar to that in FIGS. 6a-6d. Here too, the inner walls 52 in particular also extend in arcuate or curved manner in the h,k plane. However, according to FIGS. 12a-12b, the passage openings 61 of the clamping part 300 between two pairs of inner walls 52 are flared towards the indentations or receiving grooves 36 of the outer wall 50 having the clamping surface 31 and tapered towards central transverse bracing 7, into which the inner walls merge. The transverse bracing 7 extends centrally in the main plane of the clamping part 300 and forms the plane of symmetry of the mirror-symmetrical walls 50, 52 or cavity structures 6 on both sides. Here too, the outer walls 50 each form a clamping surface 31 for clamping supply lines in place for strain relief in the longitudinal direction 1.

Here too, a number of inner elastic walls 52, which are produced monolithically or in one piece with the first elastic wall 50, form in a similar manner to cell walls the honeycomb-like cavity structure 6 which is open to both front sides, in particular with completely continuous passage openings 61.

As is apparent from FIG. 12b, the clamping part 300 has on its two opposing narrow sides which are positioned approximately perpendicular to the outer walls 50, or at the top and bottom, in each case two projections 323 or an indentation 324 for form-fitting retention in frame parts of a clamping apparatus 302 (FIG. 13) or crosspieces 41 are provided which extend in the clamping direction k, i.e. transversely of the longitudinal direction 1.

FIG. 13 illustrates the use of a plurality of vertically arranged clamping parts 300 in a strain reliever for a plurality of supply lines on an energy chain. The strain reliever from FIG. 13 comprises a clamping apparatus 302 with a plurality of frame parts and a quick-release fastener, with regard to the construction of which explicit reference is here made for brevity's sake to the teaching of DE 20 2017 102 147. The clamping parts 300 are form-fittingly retained in the longitudinal direction 1 with the projections 323 or indentations 324 in the profile-like crosspieces 41 of the clamping apparatus 302. Lines may readily be removed and inserted from above between in each case two clamping parts 300.

FIG. 14 illustrates the multipart housing 400 of a rectangular plug-in connector having a plurality of plug inserts to which the various lines (not shown here) are connected. Strain relief is provided in the interior of the housing 400 remote from the plug inserts by two opposingly arranged clamping parts 3; 300, for example according to FIGS. 12*a*-12*b* or FIGS. 6*a*-6*d*, which are here arranged horizontally in the housing 400 and indicated only diagrammatically.

LIST OF REFERENCE SIGNS

1; 1" Strain reliever
2; 2" Clamping apparatus
3; 3"; 300 Clamping part
31; 31" Clamping surface
32; 32" Receiving channel
33 Clamping portion
34 Retaining region
35 Clamping region
36 Receiving groove
4; 4" Receiving frame
41; 41" Crosspiece
50 Outer wall (with clamping surface)
52 Inner wall
54 Nodal line
6 Cavity structure
61 Passage opening
62 Crest
63 Side surface
7 Transverse bracing
71 Crosspiece
72 Thickened portion
8 Plug-in connection
81 Plug-in projection
82 Plug-in opening
9 End-fastening part
91 Connection port
92 Connecting side strap
302 Clamping apparatus
323; 324 Holder
400 Plug housing
401 Plug insert
h Height direction
k Clamping direction
l Longitudinal direction
q Transverse direction
V Supply line

What is claimed is:

1. A strain reliever for supply lines of a supply line device, comprising:
a clamping apparatus having at least one block-like clamping part which has a side surface configured as a clamping surface for clamping the supply lines in place in a clamping direction against a further clamping surface of the clamping apparatus, the strain reliever being designed for passage of the supply lines in a longitudinal direction perpendicular or approximately perpendicular to the clamping direction, wherein the clamping surface is formed, at least in a clamping portion intended for clamping the supply lines in place, by an elastic wall, wherein, on a side facing away from the clamping surface, the elastic wall bounds a cavity structure which extends through the clamping part in or approximately in the longitudinal direction, wherein a number of passage openings of the cavity structure adjoin one another via further inner elastic walls, wherein the clamping part has a transverse bracing, which extends over a main dimension and which is connected in one piece to a lattice-like arrangement, and wherein the lattice-like arrangement comprises walls arranged in pairs, wherein the walls in each pair have an interposed passage opening which has a cross-sectional shape which tapers to a point away from the elastic wall and the walls in each pair merge at an end region remote from the clamping surface in one piece into the transverse bracing.

2. The strain reliever as claimed in claim 1, wherein the cavity structure is defined by one or more passage openings extending in the longitudinal direction, at least some of which are bounded by the elastic wall.

3. The strain reliever as claimed in claim 1, wherein a wall thickness of the elastic wall or of the elastic walls is less than or equal to one third of an average diameter, less than or equal to one eighth of the average diameter or less than or equal to one tenth in each case of the average diameter of mutually adjoining passage openings.

4. The strain reliever as claimed in claim 1, wherein at least the passage openings associated with the clamping surface are congruent, wherein the passage openings in each case have a shape of a right prism.

5. The strain reliever as claimed in claim 4, wherein the passage openings have the shape of the right prism with an approximately triangular base area and with crests, wherein the triangle of the base area in one group of passage openings is arranged with one vertex pointing contrary to the clamping direction and in another group of passage openings with one vertex pointing in the clamping direction.

6. The strain reliever as claimed in claim 5, wherein the passage openings of the one group are in each case bounded with the vertex pointing contrary to the clamping direction by the elastic wall having the clamping surface, wherein, with regard to a direction perpendicular to the longitudinal direction and clamping direction, the passage openings of the one group are arranged with regard to direction alternatingly to the passage openings of the other group and/or mutually aligned.

7. The strain reliever as claimed in claim 1, wherein the passage openings are in a honeycomb-like arrangement in at least two mutually parallel rows.

8. The strain reliever as claimed in claim 1, wherein transverse bracing which extends over a length of the clamping part and perpendicular to the longitudinal direction and clamping direction is provided in a central region with regard to the longitudinal direction and/or in that transverse bracing which extends over the length of the clamping part and in the clamping direction is provided in a central and/or end region with regard to a direction perpendicular to the longitudinal direction and clamping direction.

9. The strain reliever as claimed in claim 1, wherein the clamping part has a further clamping surface which is arranged remote from the one clamping surface of the clamping part, wherein the clamping part is preferably of mirror-symmetrical construction to a main axis.

10. The strain reliever as claimed in claim 1, wherein at least one further clamping part of identical construction is provided, wherein the two clamping parts are arranged in the installation position in the strain reliever with their clamping surfaces opposite one another.

11. The strain reliever as claimed in claim 2, wherein the cavity structure has a plurality of at least eighteen passage openings bounded by elastic walls, wherein the passage openings are arranged in at least two rows which in each case extend in a transverse direction transversely of the longitudinal direction and transversely of the clamping direction and/or wherein the average diameter of the passage openings is less than 50% of the dimension of the clamping part in the clamping direction.

12. An end-fastening part for an energy chain having the strain reliever as claimed in claim 1, wherein a number of clamping parts are held in a frame in an orientation with substantially perpendicular extending clamping surfaces.

13. The end-fastening part as claimed in claim 12, wherein, for connection to the energy chain, the end-fastening part has a connection port, such as two side parts, in the case of a supply line device of chain links with side straps, two connecting side straps adapted to the side straps.

14. An energy chain having the strain reliever as claimed in 1.

15. The strain reliever as claimed in claim 1, wherein each pair of the walls arranged in pairs has opposing walls that have an opposing curvature with respect to each other.

16. A clamping part for the strain reliever, comprising:
the clamping part being produced in one piece from an elastic plastics material and having two opposing side surfaces each of which comprises a clamping surface for clamping at least one supply line in place in a clamping direction against a further clamping surface, for strain relief of the at least one supply line in a longitudinal direction perpendicular or approximately perpendicular to the clamping surface, wherein at least one side surface, preferably both side surfaces in each case has/have, at least in a region of the clamping surface intended for clamping the supply lines in place, a first elastic wall which bounds a cavity structure on a side facing away from the clamping surface, which structure is formed by a lattice-like arrangement of a number of further elastic walls which are connected in one piece to the first elastic wall, wherein the cavity structure has a number of passage openings which adjoin one another via the further elastic walls, wherein the clamping part has a transverse bracing, which extends over a main dimension and which is connected in one piece to the lattice-like arrangement, and wherein the lattice-like arrangement comprises walls arranged in pairs, wherein the walls in each pair have an interposed passage opening which has a cross-sectional shape which tapers to a point away from the elastic wall and the walls in each pair merge at an end region remote from the clamping surface in one piece into the transverse bracing.

17. The clamping part as claimed in claim 16, wherein the clamping part is of mirror-symmetrical construction with regard to a main plane perpendicular to the clamping direction.

18. The clamping part as claimed in claim 16, wherein the cavity structure has a plurality of passage openings extending in the longitudinal direction which extend at least predominantly or completely continuously in or approximately in the longitudinal direction through the clamping part, wherein the cavity structure is of honeycomb-like construction and the elastic walls form cell walls which bound the passage openings perpendicular to the longitudinal direction.

19. The clamping part as claimed in claim 16, wherein each pair of the walls arranged in pairs has opposing walls that have an opposing curvature with respect to each other.

20. The clamping part as claimed in claim 16, wherein the cavity structure has at least eighteen passage openings bounded by elastic walls, wherein the passage openings are arranged in at least two rows which in each case extend in a transverse direction transversely of the longitudinal direction and transversely of the clamping direction and/or wherein an average diameter of the passage openings is less than 50% of a dimension of the clamping part in the clamping direction.

21. The use of the clamping part as claimed in claim 16 in a strain reliever with a plurality of supply lines in a strain reliever of an energy chain.

22. A clamping part for a strain reliever, comprising:
the clamping part being produced in one piece from an elastic plastics material and having two opposing side surfaces each of which comprises a clamping surface for clamping at least one supply line in place in a clamping direction against a further clamping surface, for strain relief of the at least one supply line in a longitudinal direction perpendicular or approximately perpendicular to the clamping surface, wherein at least one side surface, preferably both side surfaces in each case has/have, at least in a region of the clamping surface intended for clamping the supply lines in place, a first elastic wall which bounds a cavity structure on a side facing away from the clamping surface, which structure is formed by a lattice-like arrangement of a number of further elastic walls which are connected in one piece to the first elastic wall, wherein the cavity structure has a number of passage openings which adjoin one another via the further elastic walls, wherein, on two opposing narrow sides of the clamping part, which are positioned perpendicular to the side surfaces, in each case at least one projection and/or one indentation is provided for form-fitting retention in a frame, wherein the projection and/or the indentation extends in the clamping direction or transversely of the longitudinal direction.

23. The clamping part as claimed in claim 22, wherein the cavity structure has at least eighteen passage openings bounded by elastic walls, wherein the passage openings are arranged in at least two rows which in each case extend in a transverse direction transversely of the longitudinal direction and transversely of the clamping direction and/or wherein an average diameter of the passage openings is less than 50% of a dimension of the clamping part in the clamping direction.

24. The use of the clamping part as claimed in claim 22 in a strain reliever with a plurality of supply lines in a strain reliever of an energy chain.

25. The use of the clamping part as claimed in claim 22 in a strain reliever in a housing of a plug-in connector of a rectangular plug-in connector having a plurality of plug inserts.

26. The clamping part as claimed in claim 22, wherein the clamping part is of mirror-symmetrical construction with regard to a main plane perpendicular to the clamping direction.

27. The clamping part as claimed in claim 22, wherein the cavity structure has a plurality of passage openings extending in the longitudinal direction which extend at least predominantly or completely continuously in or approximately in the longitudinal direction through the clamping part, wherein the cavity structure is of honeycomb-like construction and the elastic walls form cell walls which bound the passage openings perpendicular to the longitudinal direction.

28. The clamping part as claimed in claim 22, wherein the opposing walls in each pair in each case have an interposed passage opening which has a cross-sectional shape which tapers to a point away from the elastic wall.

\* \* \* \* \*